Jan. 6, 1942.　　　　L. EMANUELI　　　　2,268,704
ELECTRIC CABLE
Filed Feb. 7, 1939
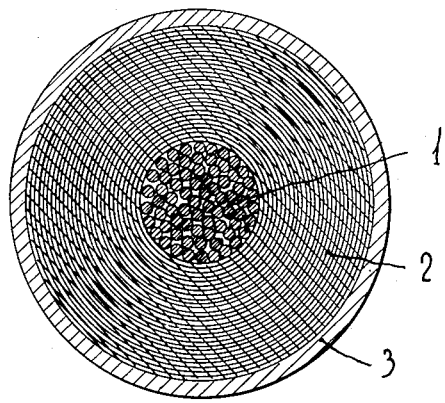
Constant volume cable impregnated with a gasogenic oil containing a saturated hydrocarbon of the aliphatic series.
Inventor
Luigi Emanueli,
By Stone, Boyden & Mack.
Attorneys Patented Jan. 6, 1942

2,268,704

UNITED STATES PATENT OFFICE 2,268,704

ELECTRIC CABLE

Luigi Emanueli, Milan, Italy, assignor to Societá Italiana Pirelli, Milan, Italy Application February 7, 1939, Serial No. 255,167
In Italy February 10, 1938

5 Claims. (Cl. 174—25)

This invention relates to electric cable installations, and more particularly to installations comprising cables in which the insulated conductor or conductors are enclosed within an impermeable tubular container, such as a lead sheath.

In such cables, the solid insulation is impregnated with oil or similar fluent material, which also fills any passages or spaces within the sheath, and the thermal expansion or contraction of this fluent insulating material with changes in temperature has given rise to serious practical difficulties.

The invention is specially applicable to cable systems or installations of the constant volume type, that is to say, installations in which the fluent insulating material is confined at all times within the tubular container or sheath, and expansion and contraction takes place entirely in this substantially fixed or unvarying space.

Whilst in cable systems of the variable volume type, such as disclosed, for example, in my Patent No. 1,962,059, issued June 5, 1934, and which are mostly used for high tensions, the impregnating medium is allowed to expand freely, and its pressure is maintained within restricted limits, in cable systems of the constant volume type, which are the systems generally used for lower tensions, the inside pressure may vary considerably, not only rising to several atmospheres when the cable is under heavy load but also dropping to a few centimetres of mercury when the cable is cold. The impregnating medium of these cables is usually a viscous material, which therefore flows with some difficulty, so that when the pressure is low many cavities form, containing gas and vapour capable of ionizing with very low potential differences, even lower than those corresponding to the working voltage. This constitutes, as is well known, a danger to the cable due to corona glows or streamer discharges which may be originated and which can in time cause real discharges or actual arcs, with the consequent breakdown of the insulation. Further, in cable systems of the constant volume type, it is the practice to use impregnating mediums which, as will be explained later, increase this danger.

It is already known that the mineral oils generally used, either alone or with other ingredients, for the impregnation of cables, when in the presence of gaseous substances, behave differently from each other when subjected to the action of a sufficiently high electric field. A gas submitted to the action of an intense electric field becomes ionized, and when its ions and electrons violently encounter the molecules of the substances which are in contact with the gas, changes of a chemical nature may be produced in the same. Oils having components mainly of the paraffine type, especially if highly refined and rich in saturated hydrocarbons of the aliphatic series, are gaseogenic under said conditions, that is they develop gases, mainly hydrogen, as a result of chemical reaction provoked by the electric field. This hydrogen, before the reaction, did not exist in the free state but was chemically combined with carbon to form the numerous substances which constitute the impregnating means. It is difficult to indicate exactly what chemical reactions take place, because they can be of very different natures, and they are not yet completely known. What is certain, however, is that the production of gas does take place under the influence of the electric field. Oils having, on the other hand, prevalently olefin or aromatic components, particularly if not very refined and with a large unsaturated hydrocarbon content, have the faculty under said conditions of absorbing any gases which may be present, especially hydrogen. These chemical reactions caused by the electric field only occur, however, as above stated, when any gas present in the insulation becomes ionized, and it is known that the ionization potential becomes lower as the pressure decreases. Now, in ordinary cables, such as used in installations of the constant volume type, it has up to the present time been usual to employ very viscous, only slightly refined oils, which therefore have a high unsaturated hydrocarbon content. These oils, owing to their nature, absorb gas under the action of the electric field and this characteristic is even increased by the presence of resins, colophony, etc., which are generally added to the oils in question. It therefore happens that, at the low pressures caused by the contraction of the impregnated cables during cooling, the ionization produced in these cables by the application of potential gives rise to a considerable absorption of gas. This causes a further lowering of the pressure and the ionization phenomenon therefore increases automatically, so reducing the life of the cable.

This undesirable condition has arisen particularly in latter years because it has been considered necessary to have the best possible vacuum for the impregnation of the cable, in order to reduce the traces of residual gas to a minimum, which means that the pressure in these remaining inevitable traces is very small, even from the time of manufacture.

It will be realized from the above how advantageous it would be to maintain in cable systems of the constant volume type, a pressure sufficiently high to avoid ionization, as is done in the case of cable systems of the variable volume type.

The object of the present invention is to use the above described development of gas to maintain the inside pressure in a cable with an oil impregnated insulation used in a system of the constant volume type automatically at a predetermined value which is substantially constant, this value being high enough to practically prevent ionization under normal working conditions.

To aid in a better understanding of the invention, reference is had to the accompanying drawing, forming part of this specification, and in which the figure is a cross-sectional view of a conventional single conductor, sheathed cable of the constant volume type.

The cables made in accordance with the present invention have one or more conductors 1, shown as of the solid stranded type, covered with an insulation 2, such as paper, impregnated with a very gasogenic oil or oil compound and enclosed in an impermeable sheath 3 of substantially constant volume, for example a lead tube. The insulating fluid entraps inclusions of gas, usually hydrogen, at a pressure which, when the cable is operating, is of the order of a few atmospheres. To withstand this pressure it may in certain cases be necessary for the sheath to have a suitable reinforcement, which may be of any of the known types.

Any of the usual methods for covering the conductor or conductors with insulation, for drying and evacuating the insulation and for applying the outer sheath can be followed for these cables, but it is advisable to first introduce hydrogen into the evacuated insulation before the impregnation, to remove all traces of air, and then, after vacuum has been again established to a suitable small pressure, for instance greater than 1 cm. of mercury, to cause a very gasogenic oil to penetrate into the insulation.

Suitable substances can be added to the oil to increase its gasogenity, these being chosen particularly from amongst the saturated hydrocarbons, as will be explained later. Lastly a potential not lower than the working voltage is applied to the cable, either in the factory or after the laying has been completed, for a given time, in order to produce the ionization of the gaseous inclusions contained in the insulation and to simultaneously produce new gas, mostly hydrogen, from the insulating fluid itself, so raising the inside pressure to a point at which ionization is no longer possible at the applied voltage. The ionization at this point automatically becomes substantially arrested.

When choosing the insulating oils to be used it is advisable to take account of the fact, proved by many experiments, that not all saturated hydrocarbons of the aliphatic series develop gas to the same extent and that those with branch chain molecules develop gas to a greater degree. As, on the other hand, the intensity of the gaseous production is greater the higher the vapor pressure of the hydrocarbon, and therefore the smaller the molecular weight, it is clear that for the purpose of the present invention it is desirable to impregnate the cable with an oil having, amongst its most volatile and smaller molecular weight components, a large percentage of saturated hydrocarbons of the aliphatic series, preferably those with branch chain molecules.

Oils possessing the desired properties can also, and even better, be obtained by the addition to oils already rich in saturated hydrocarbons of suitable substances having the above characteristics and which therefore increase the gasogenicity, such, for example, as iso-octanes and iso-nonanes liquids and their homologues.

The potential to be eventually applied to the impregnated cable, even in the factory, shall not be lower than the working voltage. If, for example, a potential equal to or slightly higher than the working voltage is chosen, ionization will no longer take place in the cable insulation during normal operation, due to the pressure already previously built up in the gas enclosed therein. Then, if later, for any reason, the inside pressure drops below the given limit, where ionization again begins, the potential applied to the cable will give rise to a new development of gas which will continue until the pressure in the cable has again reached the minimum limit value; in this way an electrical self-stabilization of the pressure is obtained.

As, however, it is the usual practice to test the cable again immediately after manufacture at a potential considerably higher than the working voltage, the potential applied before such test should be raised until it reaches a value equal to the test voltage, in order to obtain the development of gas to the corresponding pressure. A gas pressure corresponding to the impeded ionization of the gas at the potential gradient so applied should, of course, be foreseen, as also the ability of the outside sheath of the cable to resist such pressure should be assured. For instance, if a cable having a maximum working gradient of 4 kv./mm. has to be tested with a maximum gradient of 10 kv./mm., this latter potential gradient shall first be applied to obtain the development of gas, which will automatically cease at a pressure of 10 atmospheres, this being the minimum pressure limit at which ionization of hydrogen no longer takes place at a potential gradient of 10 kv./mm.

It has been proved from experiments made that the chemical substances which form in the insulation simultaneously with the development of gas, for example, the so-called cable waxes, are, like the gases produced, not detrimental to the electrical qualities of the cable.

The great advantage resulting from the present invention resides therefore in insuring the absence of ionization in the cable until the inside pressure in the cable falls below that produced electrically immediately after manufacture or after laying.

What I claim is:

1. An electric cable installation of the constant volume type comprising a cable having one or more conductors covered with insulation, such insulation being impregnated with an oil made up substantially of hydrocarbons which generate gas by chemical action under the influence of the electric field due to the cable potential, whenever the inside fluid pressure drops below that at which any gas present ionizes under the applied potential, which generation of gas continues at least until the pressure rises to a point sufficiently high to substantially prevent further ionization.

2. An electric cable installation of the constant volume type comprising a cable having one or more conductors covered with insulation, the cable containing small quantities of gas, and said insulation being impregnated with an oil which generates additional quantities of the same gas by chemical reaction under the influence of the electric field due to the cable potential whenever the inside fluid pressure tends to drop to a value below the ionization point of the said gas at the existing potential, and continues such generation until the pressure rises to a point so high that ionization substantially no longer takes place.

3. An electric cable installation of the constant volume type comprising a cable having one or more conductors covered with insulation, the cable containing small quantities of hydrogen gas, and said insulation being impregnated with an oil which develops additional hydrogen gas by chemical reaction, under the influence of the electric field due to the cable potential, so as to maintain the inside pressure at a sufficiently high point to substantially prevent further ionization of the contained gas under normal working conditions.

4. In an oil impregnated, sheathed cable installation of the constant volume type, the method of constantly maintaining the inside fluid pressure above the point at which the ionization of any gas present can take place, which consists in causing the impregnating oil to develop gas automatically by chemical reaction, produced by the electric field due to the cable potential, whenever the pressure falls below said point, and to continue such development of gas until the pressure necessary to prevent ionization is reached.

5. In an oil impregnated, sheathed cable installation of the constant volume type, the method of preventing excessive ionization of any gas present, which consists in impregnating the insulation with an oil which develops gas by chemical reaction, caused by the electric field due to the cable potential, whenever the pressure falls below the ionization point, and which continues to develop gas until the pressure rises to such a value that ionization no longer takes place.

LUIGI EMANUELI